US012736081B2

(12) United States Patent
Liao et al.

(10) Patent No.: US 12,736,081 B2
(45) Date of Patent: Sep. 15, 2026

(54) LINEAR GUIDEWAY

(71) Applicant: OME TECHNOLOGY CO., LTD., Taoyuan City (TW)

(72) Inventors: Kuo-Fu Liao, Taoyuan City (TW); Jo-Hsuan Chang, Taoyuan City (TW); Wei-Min Wang, Taoyuan City (TW); Yue-Ru Sung, Taoyuan City (TW); Yen-Chen Chen, Taoyuan City (TW)

(73) Assignee: OME TECHNOLOGY CO., LTD., Taoyuan City (TW)

( * ) Notice: Subject to any disclaimer, the term of this patent is extended or adjusted under 35 U.S.C. 154(b) by 36 days.

(21) Appl. No.: 18/944,187

(22) Filed: Nov. 12, 2024

(65) Prior Publication Data

US 2026/0063169 A1 Mar. 5, 2026

(30) Foreign Application Priority Data

Sep. 5, 2024 (TW) ................................ 113133565

(51) Int. Cl.
*F16C 29/06* (2006.01)
*F16C 33/66* (2006.01)

(52) U.S. Cl.
CPC ........ *F16C 29/0609* (2013.01); *F16C 29/065* (2013.01); *F16C 33/6659* (2013.01)

(58) Field of Classification Search
CPC .. F16C 29/06; F16C 29/0602; F16C 29/0609; F16C 29/065; F16C 33/66; F16C 33/6637; F16C 33/6659; F16C 33/6674; F16C 33/6681
See application file for complete search history.

(56) References Cited

U.S. PATENT DOCUMENTS

| | | | | |
|---|---|---|---|---|
| 6,729,760 | B2 * | 5/2004 | Mochizuki | F16C 33/66 384/55 |
| 9,243,665 | B2 * | 1/2016 | Kuwabara | F16C 29/065 |
| 2008/0292227 | A1 * | 11/2008 | Chen | F16C 29/0602 384/45 |
| 2009/0136164 | A1 | 5/2009 | Pfeuffer et al. | |

(Continued)

FOREIGN PATENT DOCUMENTS

| | | |
|---|---|---|
| CN | 105121874 B | 9/2017 |
| JP | 2001182745 A | 7/2001 |

(Continued)

*Primary Examiner* — Alan B Waits
(74) *Attorney, Agent, or Firm* — Li & Cai Intellectual Property (USA) Office

(57) ABSTRACT

A linear guideway, a sliding module thereof, and a circulation seat thereof are provided. The circulation seat has two sliding channels and can be assembled to a slider. The circulation seat includes two turning segments, two outer rail segments, and two inner rail segments. Each of the two turning segments has a layout surface arranged adjacent to the slider and an oil multi-channel recessed in the layout surface and being in spatial communication with the two sliding channels. Two ends of each of the two outer rail segments are respectively connected to the two turning segments. Two ends of each of the two inner rail segments are respectively connected to the two turning segments. Each of the two outer rail segments is connected to one of the two inner rail segments through the two turning segments so as to jointly form one of the two sliding channels.

7 Claims, 13 Drawing Sheets

(56) References Cited

U.S. PATENT DOCUMENTS

| | | | | |
|---|---|---|---|---|
| 2012/0195535 | A1* | 8/2012 | Shibuya | F16C 29/065 384/13 |
| 2015/0093053 | A1* | 4/2015 | Liao | F16C 29/0609 384/13 |
| 2015/0093056 | A1* | 4/2015 | Liao | F16C 29/0607 384/44 |

FOREIGN PATENT DOCUMENTS

| | | | |
|---|---|---|---|
| JP | 201387893 | A | 5/2013 |
| WO | WO2013161260 | A1 | 10/2013 |
| WO | WO2014034083 | A1 | 3/2014 |

* cited by examiner

LINEAR GUIDEWAY

CROSS-REFERENCE TO RELATED PATENT APPLICATION

This application claims the benefit of priority to Taiwan Patent Application No. 113133565, filed on Sep. 5, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a guideway, and more particularly to a linear guideway, a sliding module thereof, and a circulation seat thereof.

BACKGROUND OF THE DISCLOSURE

A conventional linear guideway allows a plurality of rollers to be smoothly rollable in rolling channels thereof through use of a lubricating oil, such that how to enable the lubricating oil to be more evenly distributed in the rolling channels has always been one of important topics to be addressed in the relevant field.

SUMMARY OF THE DISCLOSURE

In response to the above-referenced technical inadequacies, the present disclosure provides a linear guideway, a sliding module thereof, and a circulation seat thereof for effectively improving on the issues associated with conventional linear guideways.

In order to solve the above-mentioned problems, one of the technical aspects adopted by the present disclosure is to provide a linear guideway, which includes a rail, a sliding module, and two end caps. The rail has two lateral surfaces being opposite to each other. The sliding module is slidably disposed on the rail along a sliding direction and includes a slider, two circulation seats, and a plurality of rollers. The slider includes a base portion and two lateral portions that extend from the base portion. Inner sides of the two lateral portions of the slider respectively face toward the two lateral surfaces of the rail. The two circulation seats are respectively assembled to the two lateral portions and respectively correspond in position to the two lateral surfaces. Each of the two circulation seats has two rolling channels and includes two turning segments, two outer rail segments, and two inner rail segments. The two turning segments respectively protrude from two assembling end surfaces of the slider. Each of the two turning segments has a layout surface arranged adjacent to the corresponding assembling end surface and an oil multi-channel that is recessed in the layout surface and that is in spatial communication with two of the rolling channels. The two outer rail segments are inserted into the corresponding lateral portion of the slider. Two ends of each of the two outer rail segments are respectively connected to the two turning segments. The two inner rail segments are located between the corresponding lateral portion of the slider and the corresponding lateral surface of the rail. Two ends of each of the two inner rail segments are respectively connected to the two turning segments. In each of the two circulation seats, each of the two outer rail segments is in spatial communication with one of the two inner rail segments through the two turning segments so as to jointly define one of the rolling channels. The rollers are assembled in the two circulation seats and are movably arranged in the rolling channels of the two circulation seats. The two end caps are respectively fixed to the two assembling end surfaces of the slider. Each of the two end caps has an oil injection channel. Two of the turning segments respectively belonging to the two circulation seats are disposed in one of the two end caps and enable the two oil multi-channels thereof to be in spatial communication with the oil injection channel of the corresponding end cap.

In order to solve the above-mentioned problems, another one of the technical aspects adopted by the present disclosure is to provide a sliding module of a linear guideway, which includes a slider and two circulation seats. The slider includes a base portion and two lateral portions that extend from the base portion. The two circulation seats are respectively assembled to the two lateral portions. Each of the two circulation seats has two rolling channels and includes two turning segments, two outer rail segments, and two inner rail segments. The two turning segments respectively protrude from two assembling end surfaces of the slider. Each of the two turning segments has a layout surface arranged adjacent to the corresponding assembling end surface and an oil multi-channel that is recessed in the layout surface and that is in spatial communication with two of the rolling channels. The two outer rail segments are inserted into the corresponding lateral portion of the slider. Two ends of each of the two outer rail segments are respectively connected to the two turning segments. The two inner rail segments are located between the two lateral portions of the slider. Two ends of each of the two inner rail segments are respectively connected to the two turning segments. In each of the two circulation seats, each of the two outer rail segments is in spatial communication with one of the two inner rail segments through the two turning segments so as to jointly define one of the rolling channels.

In order to solve the above-mentioned problems, yet another one of the technical aspects adopted by the present disclosure is to provide a circulation seat of a linear guideway having two rolling channels and for being assembled to a slider. The circulation seat includes two turning segments, two outer rail segments, and two inner rail segments. Each of the two turning segments has a layout surface arranged adjacent to the slider and an oil multi-channel that is recessed in the layout surface and that is in spatial communication with the two rolling channels. Two ends of each of the two outer rail segments are respectively connected to the two turning segments. Two ends of each of the two inner rail segments are respectively connected to the two turning segments. Each of the two outer rail segments is in spatial communication with one of the two inner rail segments through the two turning segments so as to jointly define one of the two rolling channels.

Therefore, any one of the linear guideway, the sliding module, and the circulation seat in the present disclosure is formed with the oil multi-channel at a specific position of each of the turning segments (e.g., the layout surface adjacent to the corresponding assembling end surface), so that a lubricating oil can be more uniformly distributed in the rolling channels for facilitating smooth rolling of the rollers.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
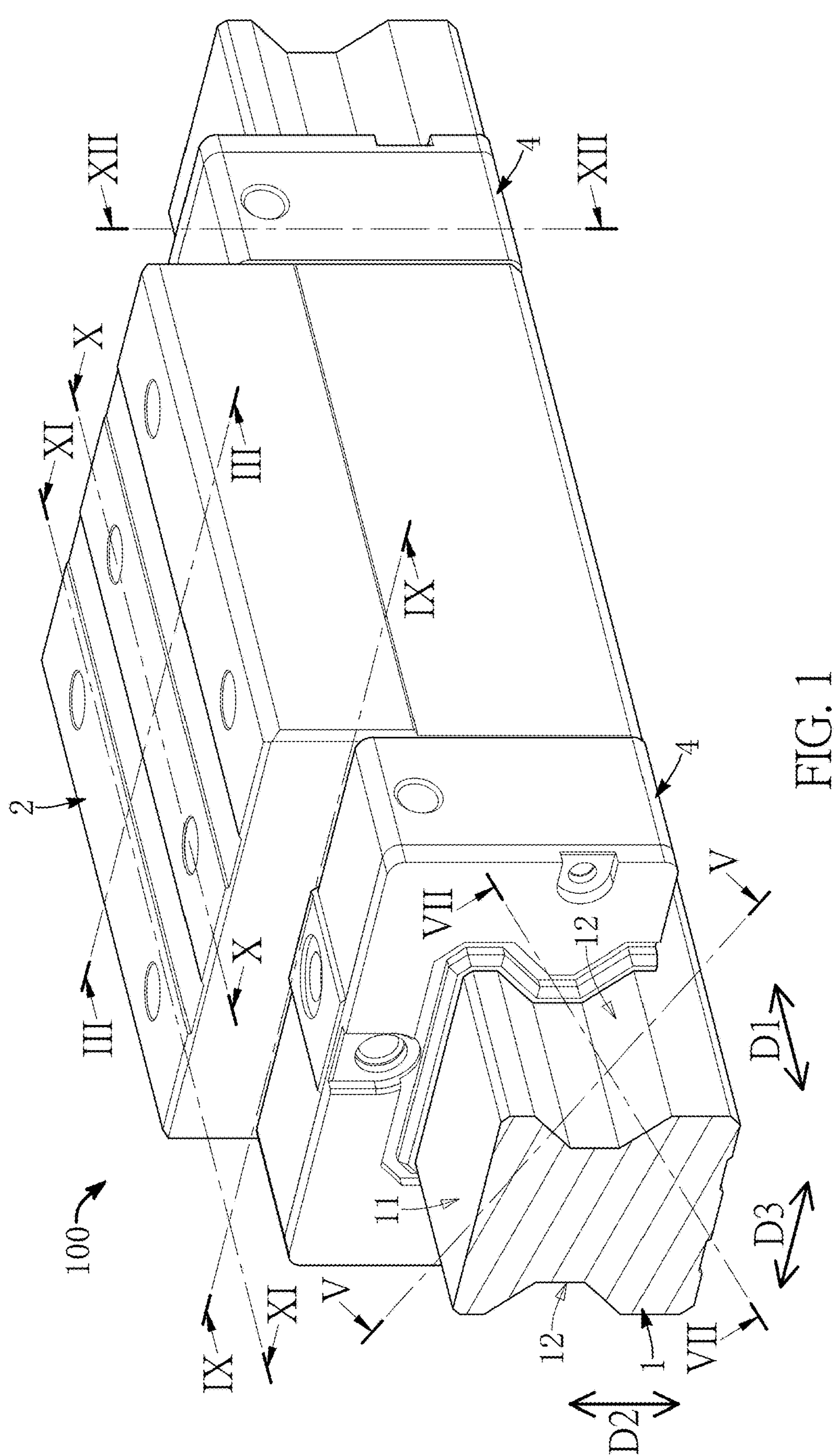
FIG. 1 is a schematic perspective view of a linear guideway according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
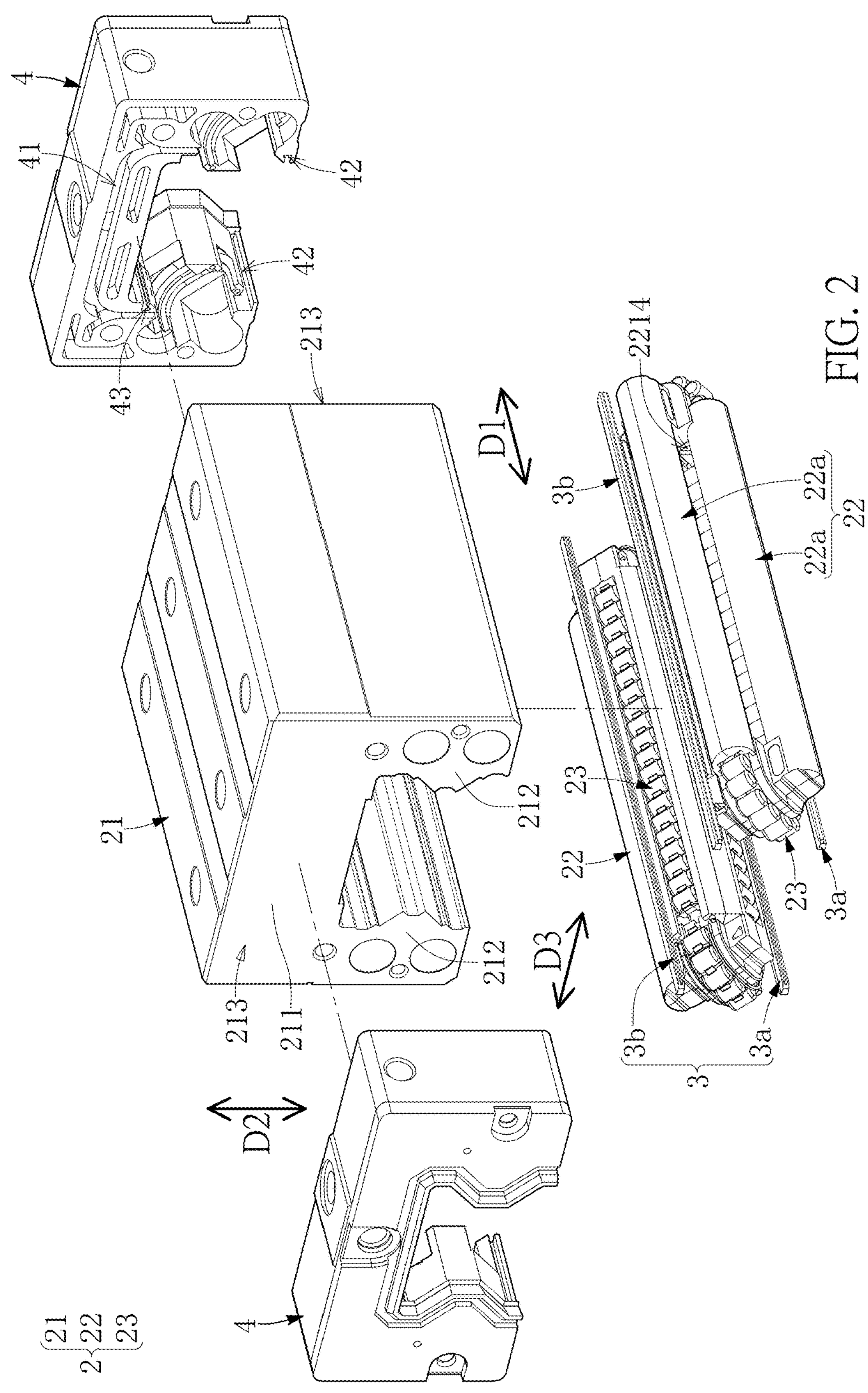
FIG. 2 is a schematic exploded view showing the linear guideway of FIG. 1 from which a rail is omitted.
Figure 3:
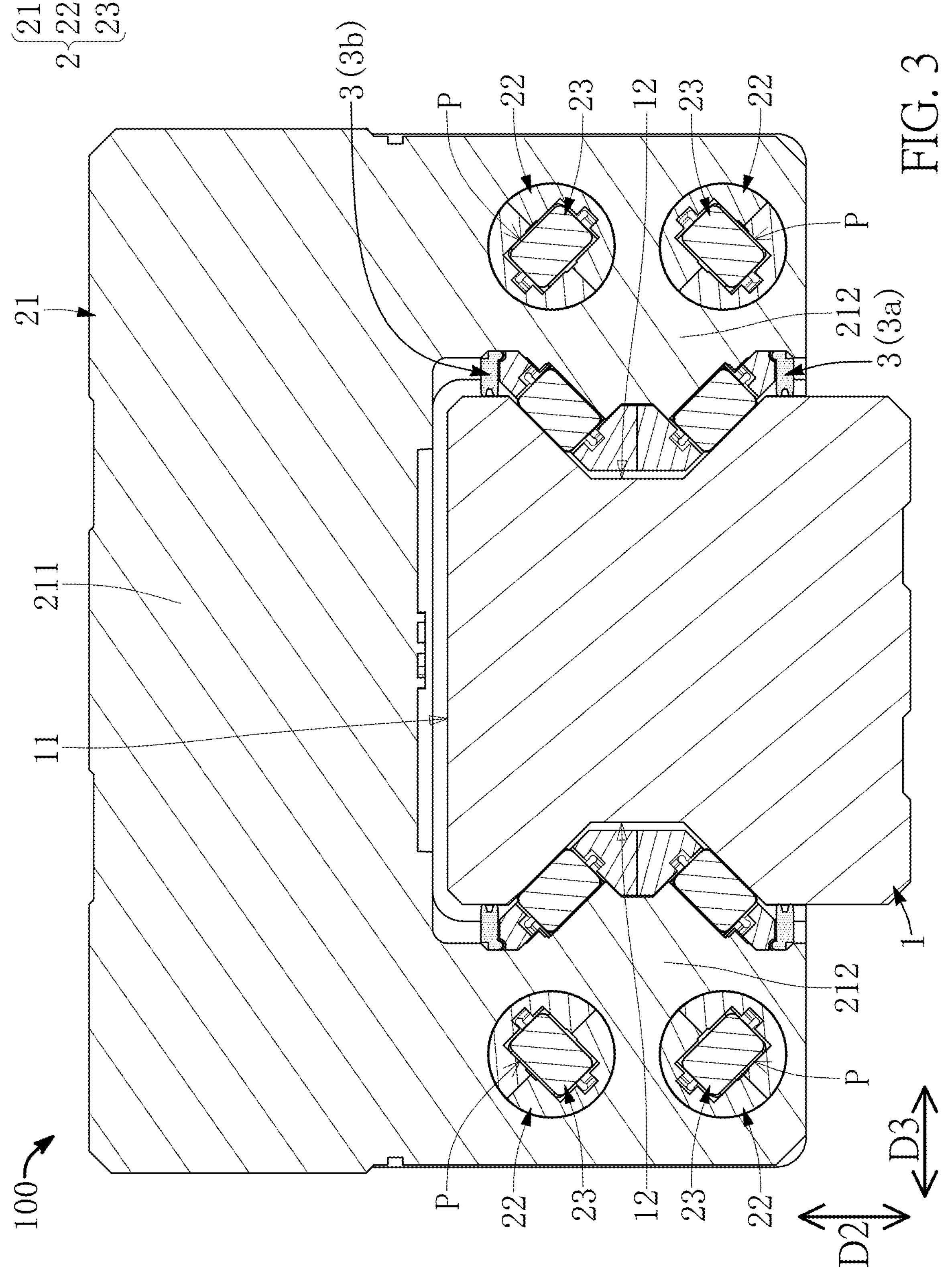
FIG. 3 is a schematic cross-sectional view taken along line III-III of FIG. 1.
Figure 4:
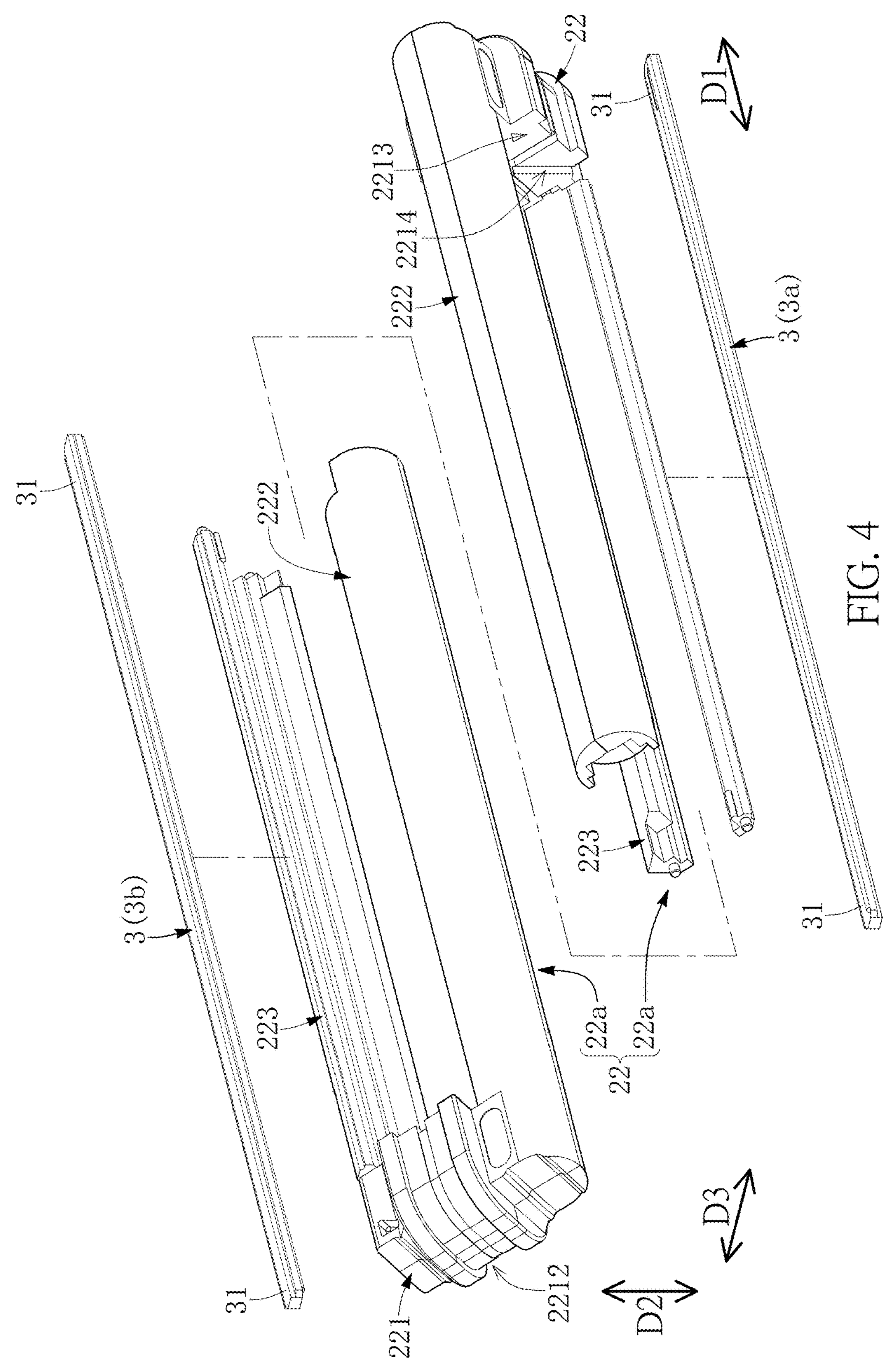
FIG. 4 is a schematic exploded view of a part of FIG. 2.
Figure 5:
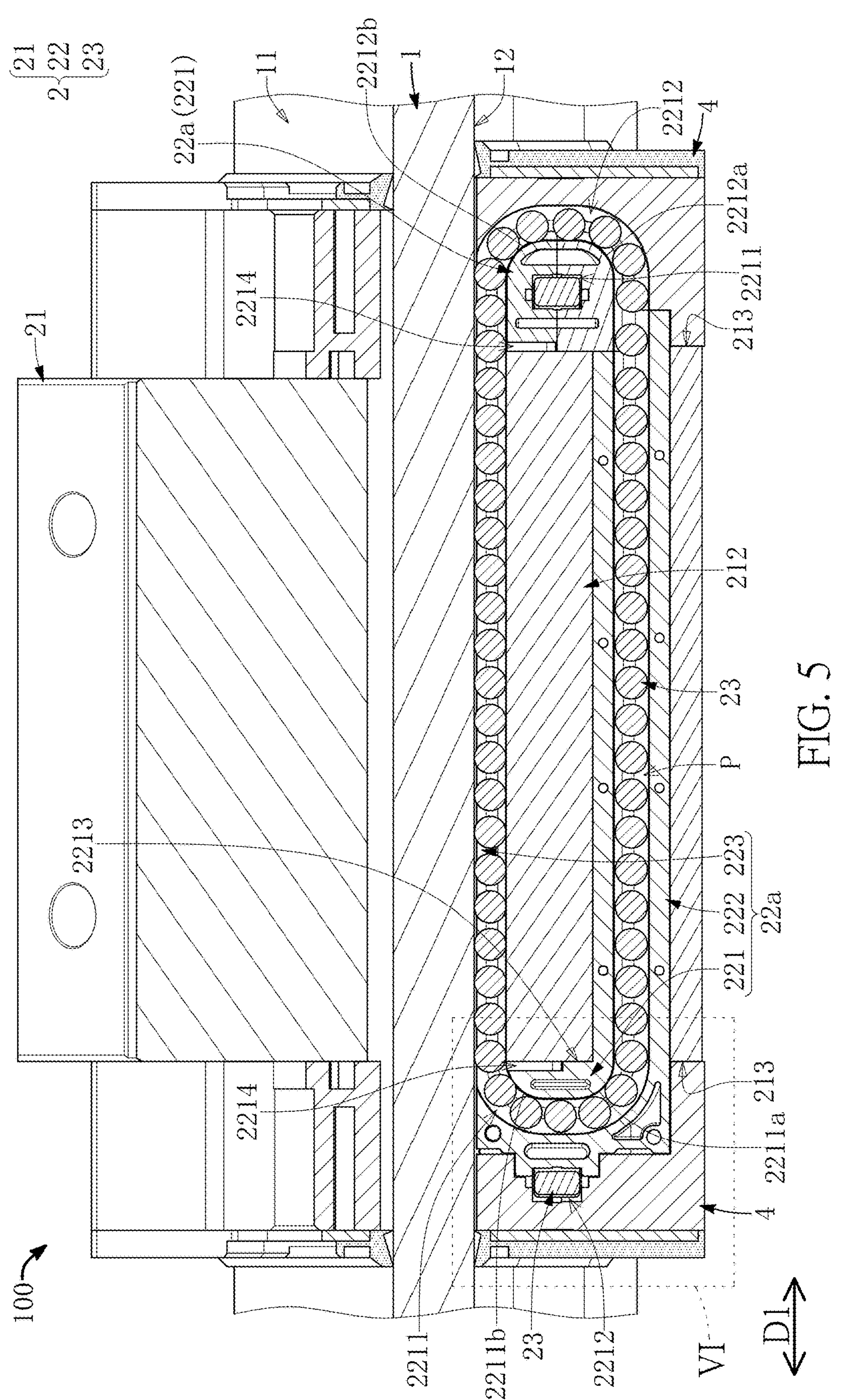
FIG. 5 is a schematic cross-sectional view taken along line V-V of FIG. 1.
Figure 6:
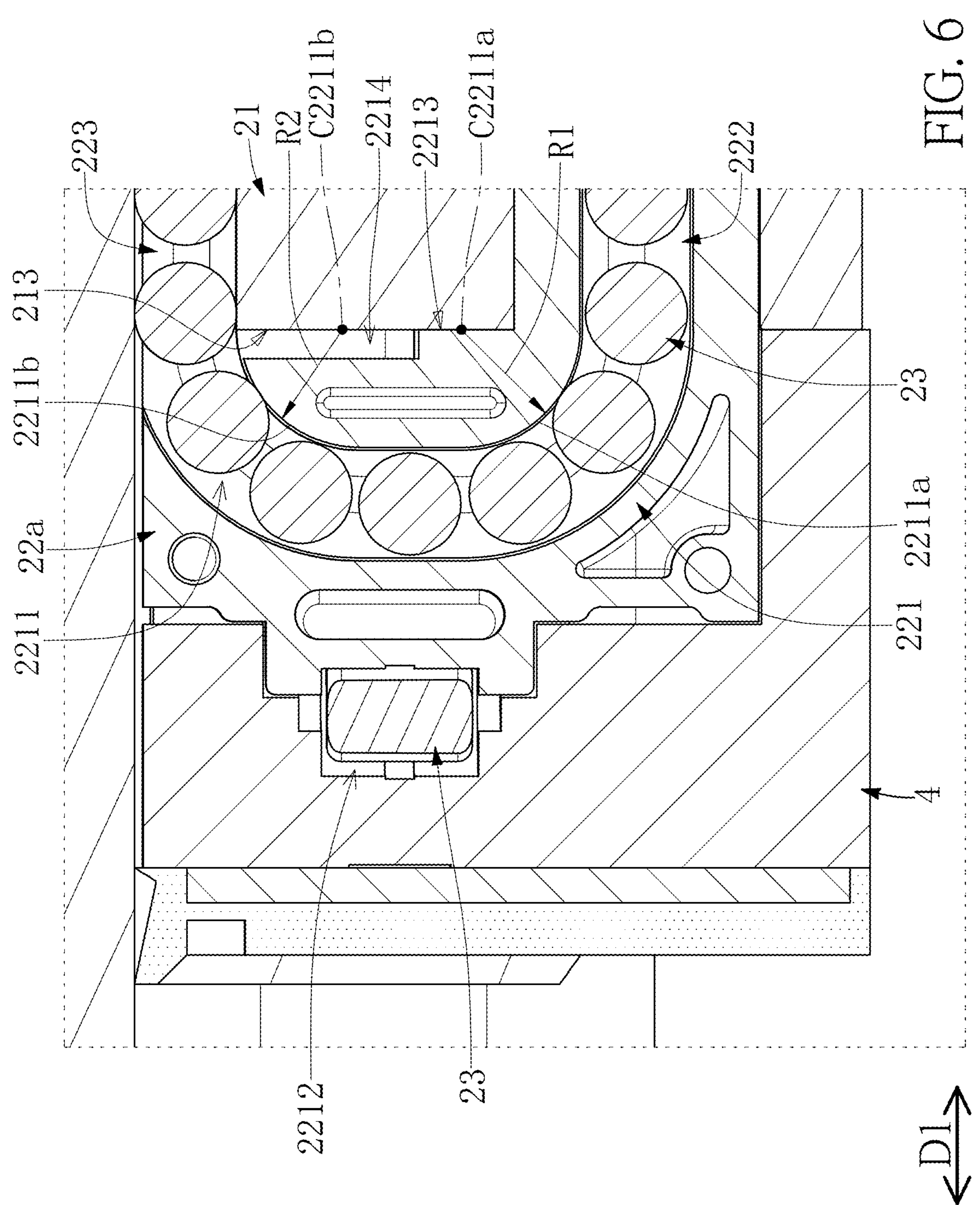
FIG. 6 is a schematic enlarged view of part VI of FIG. 5.
Figure 7:
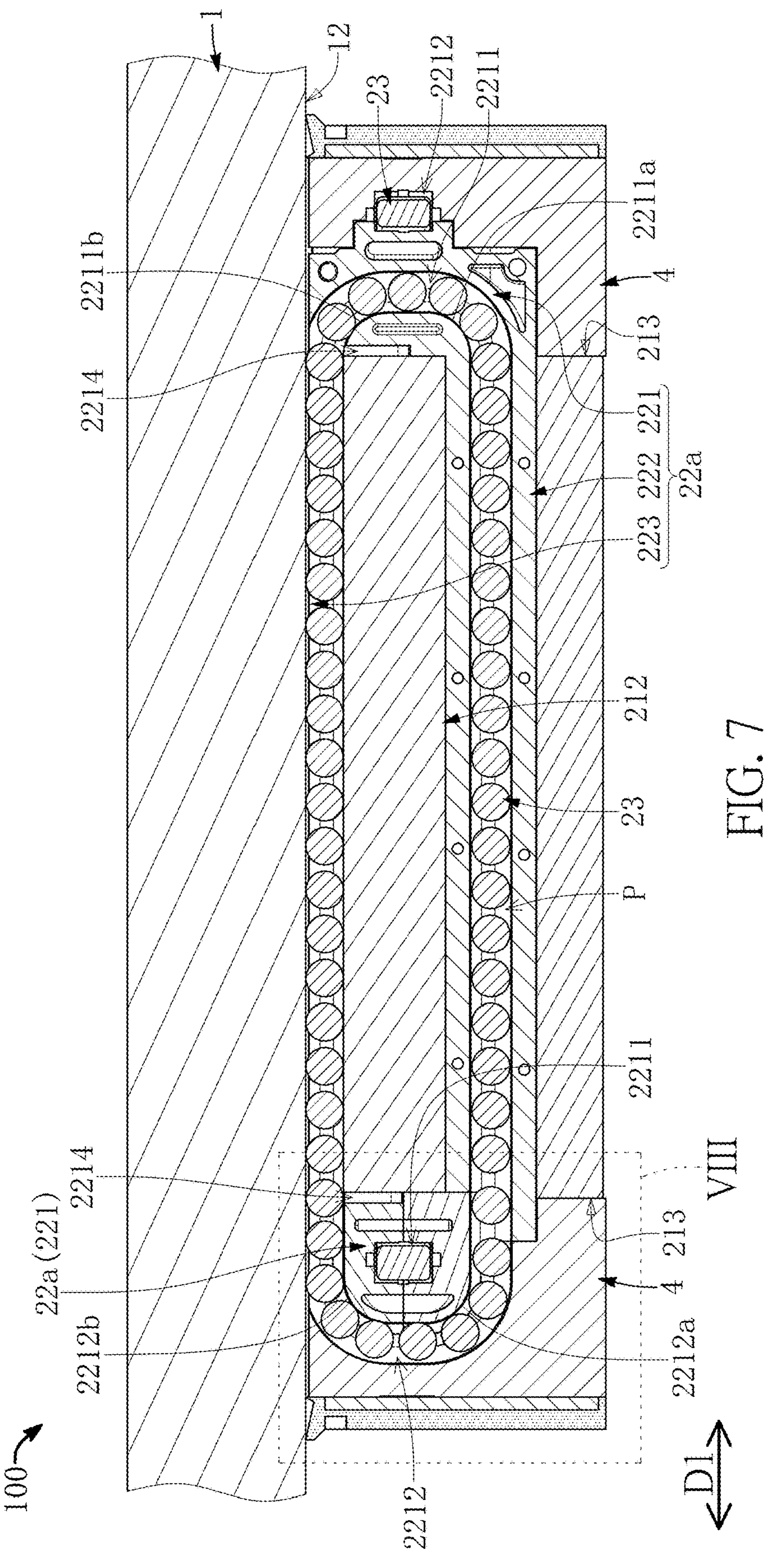
FIG. 7 is a schematic cross-sectional view taken along line VII-VII of FIG. 1.
Figure 8:
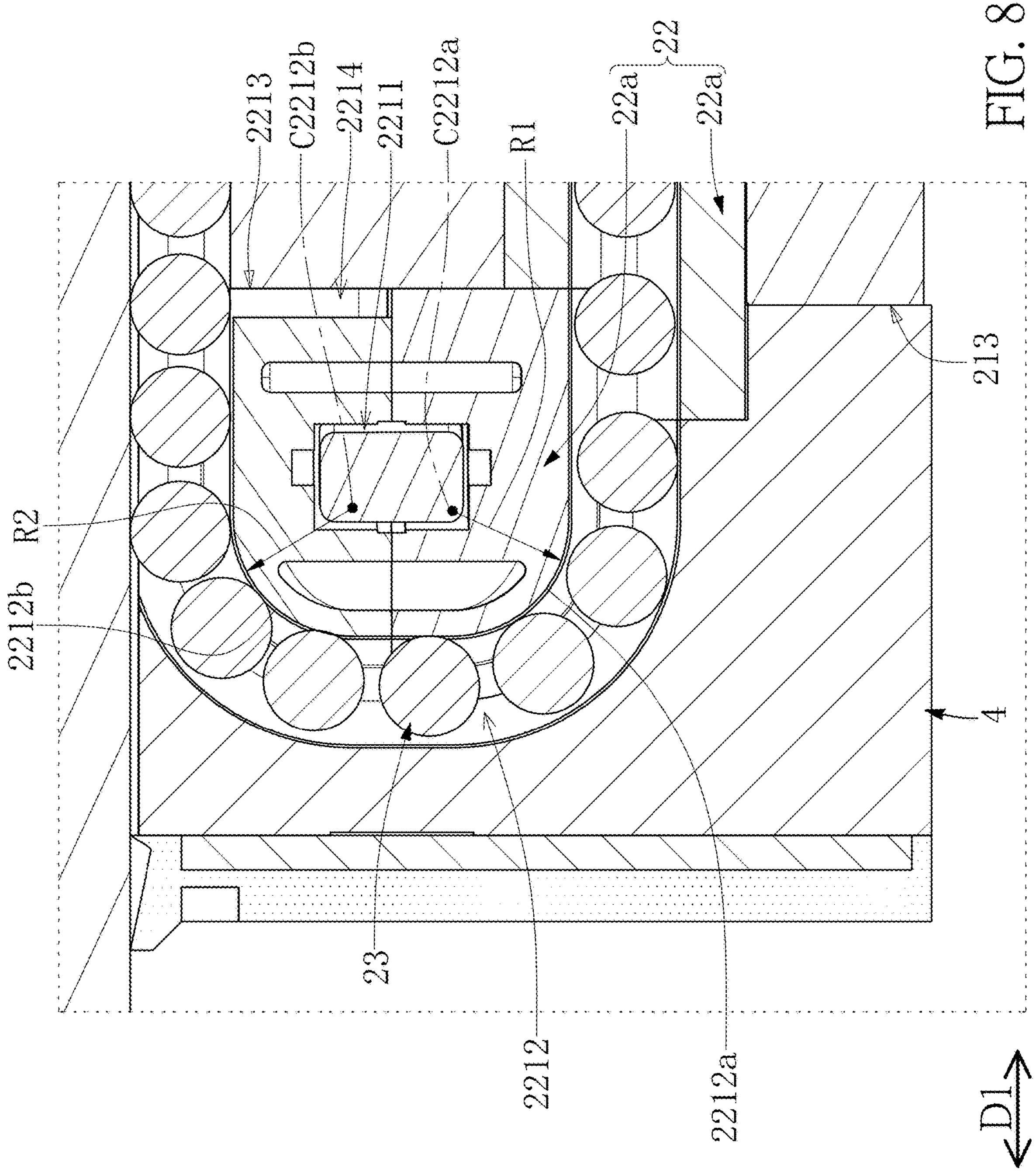
FIG. 8 is a schematic enlarged view of part VIII of FIG. 7.
Figure 9:
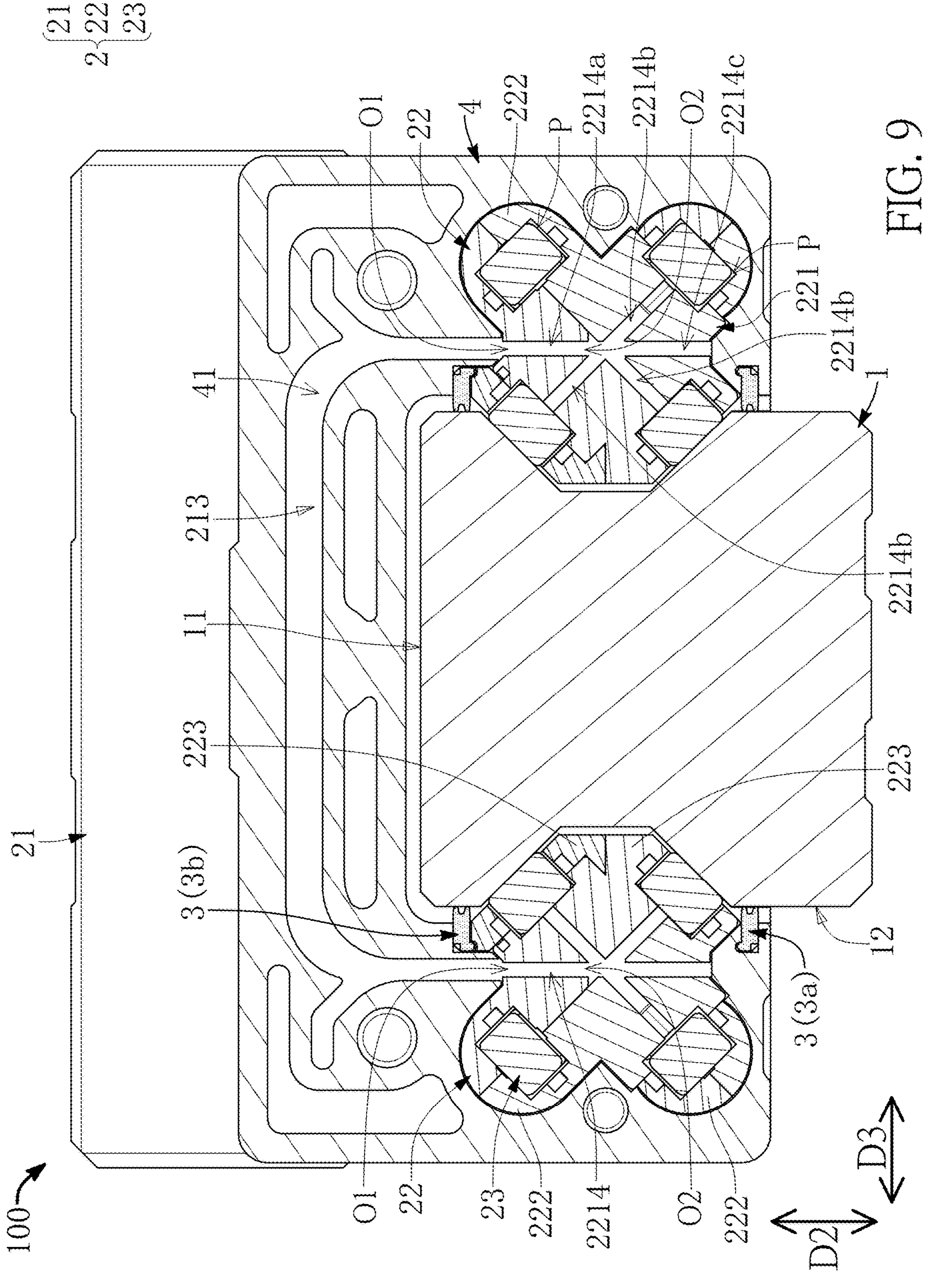
FIG. 9 is a schematic cross-sectional view taken along line IX-IX of FIG. 1.
Figure 10:
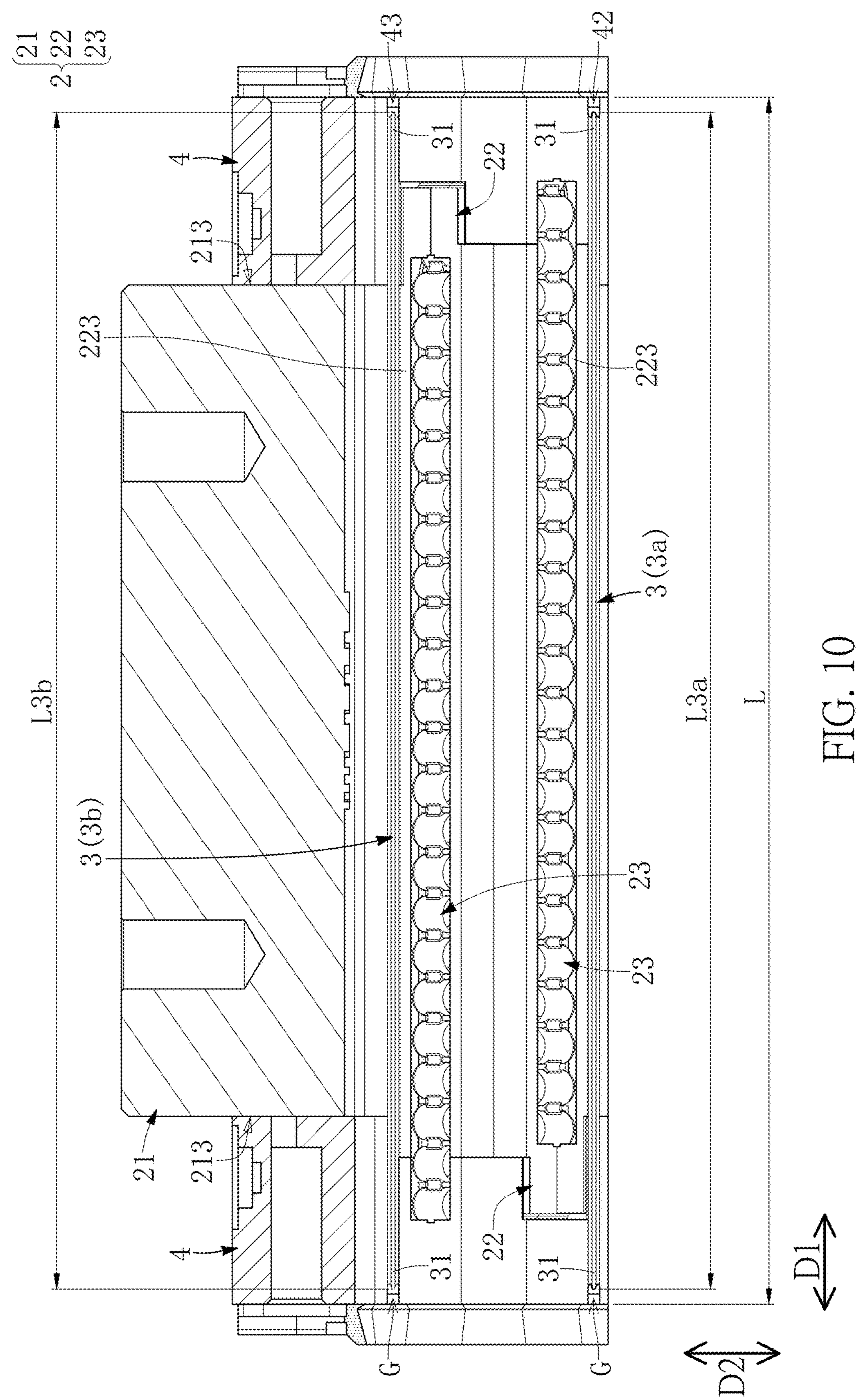
FIG. 10 is a schematic cross-sectional view taken along line X-X of FIG. 1 from which a rail is omitted.
Figure 11:
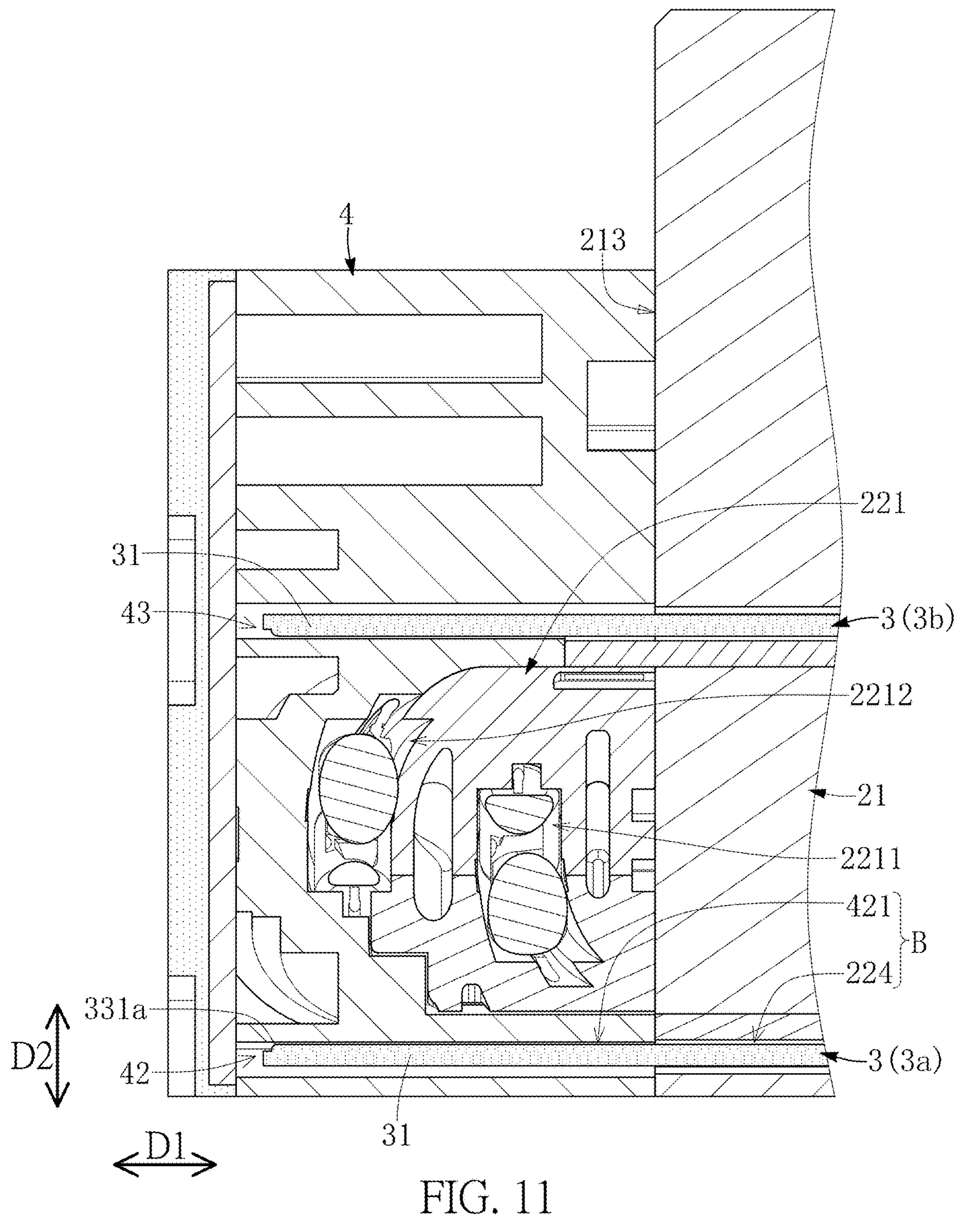
FIG. 11 is a schematic cross-sectional view taken along line XI-XI of FIG. 1.
Figure 12:
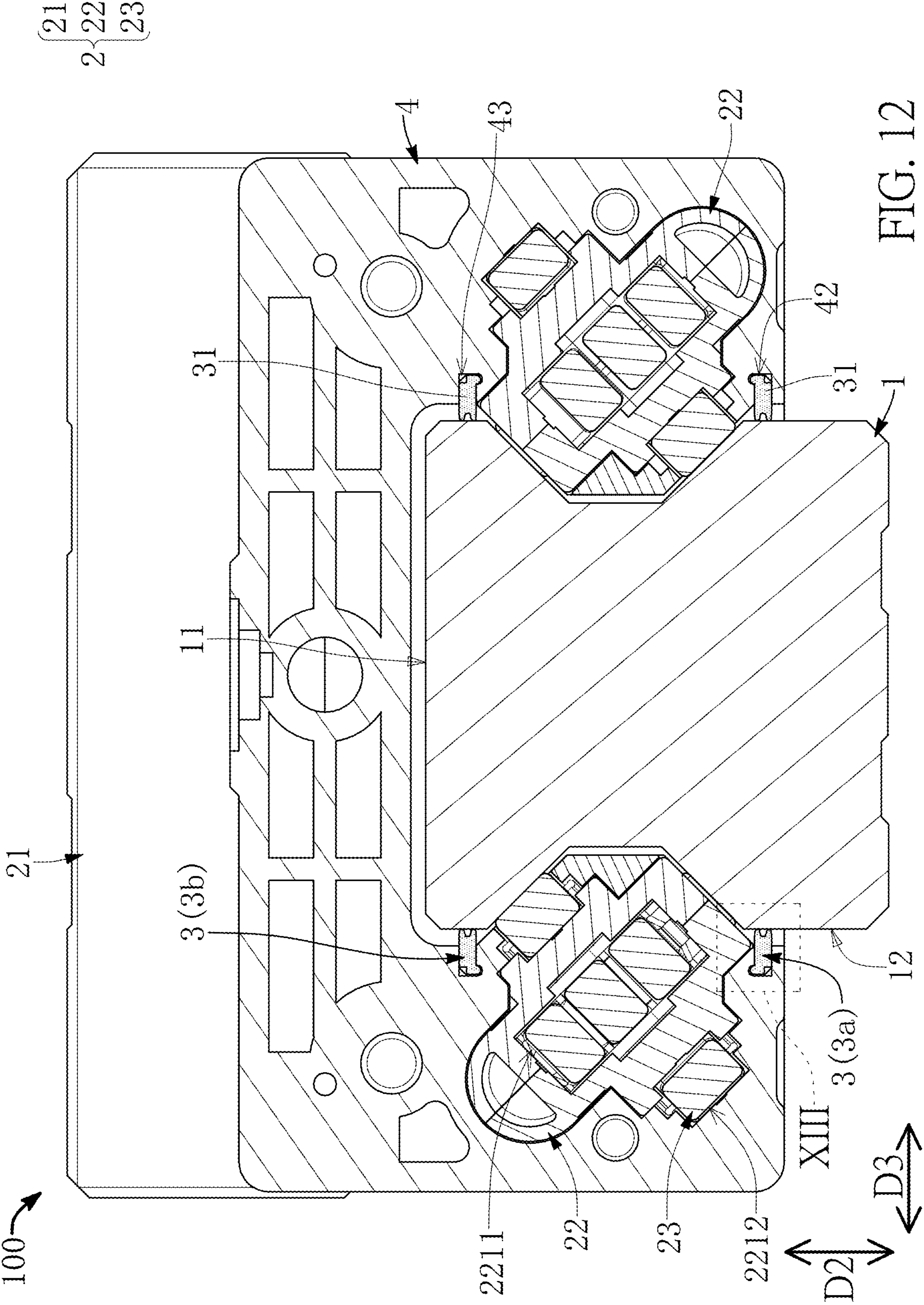
FIG. 12 is a schematic cross-sectional view taken along line XII-XII of FIG. 1.
Figure 13:
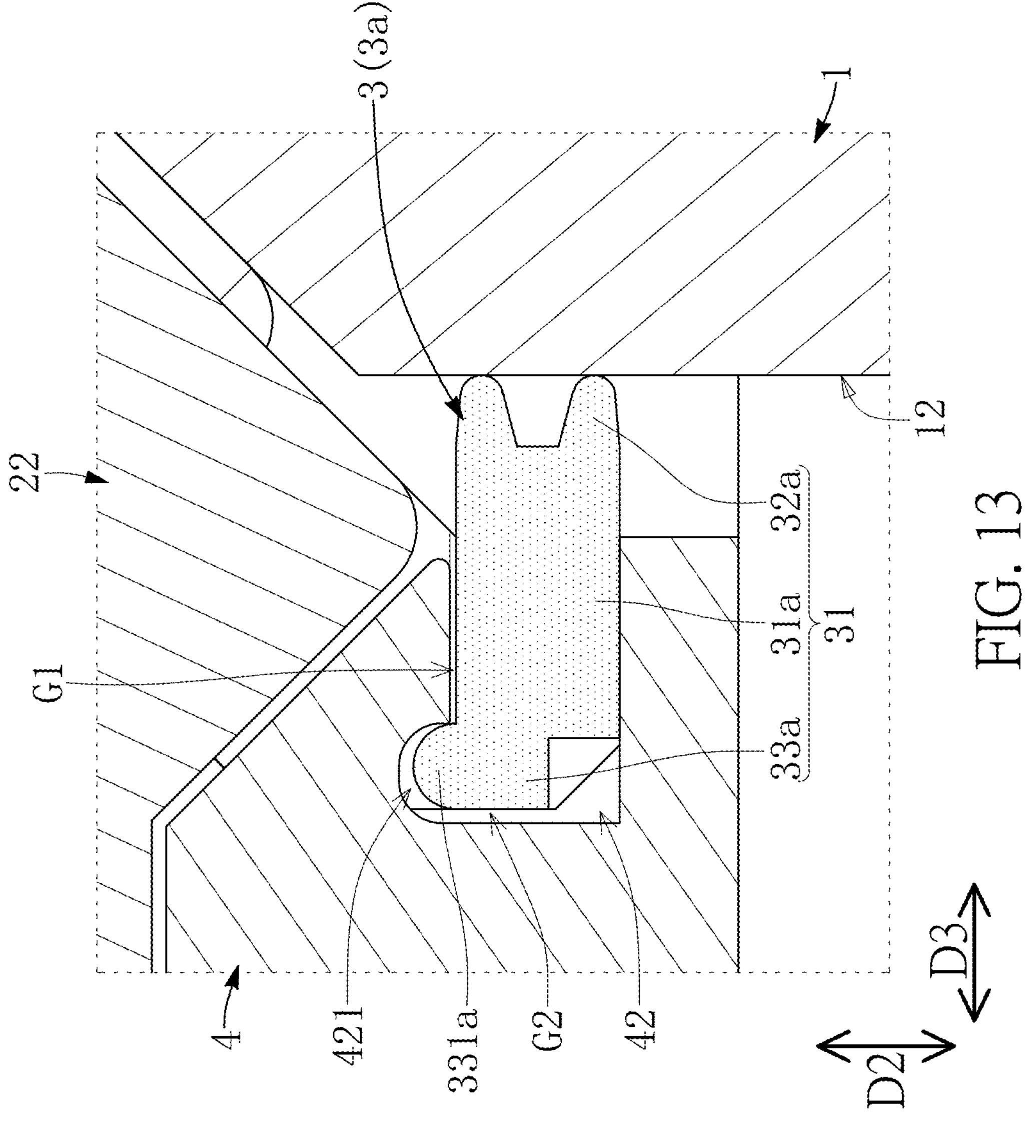
FIG. 13 is a schematic enlarged view of part XIII of FIG. 12.

Referring to FIG. 1 to FIG. 13, an embodiment of the present disclosure provides a linear guideway 100 that is described by an example of a standard linear guideway, but the present disclosure is not limited thereto. As shown in FIG. 1 to FIG. 3, the linear guideway 100 in the present embodiment includes a rail 1 being elongated, a sliding module 2 slidably disposed on the rail 1 along a sliding direction D1, a plurality of dust-proof members 3 assembled to the sliding module 2, and two end caps 4 that are respectively assembled to two opposite ends of the sliding module 2 and that are slidably disposed on the rail 1.

A longitudinal direction of the rail 1 defines the sliding direction D1, and the rail 1 has an upper surface 11 and two lateral surfaces 12 that are opposite to each other. In the present embodiment, the rail 1 has a straight shape, the two lateral surfaces 12 are respectively connected to two opposite edges of the upper surface 11, and the upper surface 11 and the two lateral surfaces 12 are parallel to the sliding direction D1, but the present disclosure is not limited thereto. For example, in other embodiments of the present disclosure not shown in the drawings, the rail 1 can be a curved structure according to practical requirements.

The sliding module 2 in the present embodiment includes a slider 21, two circulation seats 22 assembled to the slider 21, and a plurality of rollers 23 that are assembled to the two circulation seats 22. In addition, the sliding module 2 in the present embodiment includes the above components and is described in cooperation with the rail 1, the dust-proof members 3, and the two end caps 4, but the present disclosure is not limited thereto. For example, in other embodiments of the present disclosure not shown in the drawings, the sliding module 2 or the circulation seat 22 can be independently used (e.g., sold) or can be used in cooperation with other components.

The slider 21 in the present embodiment is elongated, and the sliding direction D1 can be defined by a longitudinal direction of the slider 21. The slider 21 includes a base portion 211 and two lateral portions 212 that extend from the base portion 211, and two assembling end surfaces 213 of the slider 21 are perpendicular to the sliding direction D1. Moreover, an inner side of the base portion 211 faces toward the upper surface 11 of the rail 1, and inner sides of the two lateral portions 212 respectively face toward the two lateral surfaces 12 of the rail 1.

The two circulation seats 22 are respectively assembled to the two lateral portions 212 of the slider 21, and respectively correspond in position to the two lateral surfaces 12 of the rail 1. In the present embodiment, each of the two circulation seats 22 has two rolling channels P, and the rollers 23 are movable along the rolling channels P of the two circulation seats 22. The rollers 23 in the present embodiment include a plurality of rolling columns and a plurality (e.g., four) of chain belts, but the present disclosure is not limited thereto. For example, in other embodiments of the present disclosure not shown in the drawings, the rollers 23 can be rolling balls according to practical requirements.

As the two circulation seats 22 in the present embodiment are of substantially the same structure or are mirror-symmetrical relative to the rail 1, the following description discloses the structure of just one of the two circulation seats 22 for the sake of brevity, but the present disclosure is not limited thereto. For example, in other embodiments of the present disclosure not shown in the drawings, the two circulation seats 22 can be of different structures.

As shown in FIG. 4 to FIG. 8, the circulation seat 22 includes two turning segments 221, two outer rail segments 222, and two inner rail segments 223. Two ends of each of the two outer rail segments 222 are respectively connected to the two turning segments 221, and two ends of each of the two inner rail segments 223 are respectively connected to the two turning segments 221, so that each of the two outer rail segments 222 is in spatial communication with one of the two inner rail segments 223 through the two turning segments 221 so as to jointly define one of the rolling channels P.

In the present embodiment, the circulation seat 22 includes two circulation semi-seats 22*a* that are of substantially the same structure or are mirror-symmetrical relative to each other, and each of the two circulation semi-seats 22*a* can be formed by assembling two pieces, but the present disclosure is not limited thereto. Each of the two turning segments 221 is integrally connected to one of the two outer rail segments 222 and one of the inner rail segments 223 so as to jointly form one of the two circulation semi-seats 22*a*. In other words, any one of the two turning segments 221 is integrally connected to one of the two outer rail segments 222 and one of the inner rail segments 223, and is detachably assembled to another one of the two outer rail segments 222 and another one of the inner rail segments 223, and the another one of the two outer rail segments 222 and the another one of the inner rail segments 223 are connected to another one of the two turning segments 221.

Specifically, any one of the two turning segments 221 has two outer arced sub-segments 2211*a*, 2212*a* and two inner arced sub-segments 2211*b*, 2212*b* that are respectively connected to the two outer arced sub-segments 2211*a*, 2212*a*. Each of the outer arced sub-segments 2211*a*, 2212*a* has a first radius R1, and each of the inner arced sub-segments 2211*b*, 2212*b* has a second radius R2 that is within a range from 90% to 110% of the first radius R1.

Moreover, two ends of each of the outer rail segments 222 are respectively connected to two of the outer arced sub-segments 2211*a*, 2212*a* that respectively belong to two of the turning segments 221, and two ends of each of the inner rail segments 223 are respectively connected to two of the inner arced sub-segments 2211*b*, 2212*b* that respectively belong to two of the turning segments 221.

Accordingly, each of the turning segments 221 of the linear guideway 100 in the present embodiment is configured to have a specific proportional relationship of the first radius R1 and the second radius R2, each of the outer rail segments 222 corresponds to the radius R1, and each of the inner rail segments 223 corresponds to the radius R2, such that the rollers 23 can more smoothly turn and roll along the rolling channels P.

In other words, each of the two turning segments 221 has an enclosed-type turning channel 2211 and an open-type turning channel 2212 that is arranged outside of the enclosed-type turning channel 2211. In each of the two turning segments 221, the enclosed-type turning channel 2211 includes one of the two outer arced sub-segments 2211*a* and one of the two inner arced sub-segments 2211*b* that are connected to each other, and the open-type turning channel 2212 includes another one of the two outer arced sub-segments 2212*a* and another one of the two inner arced sub-segments 2212*b* that are connected to each other. Moreover, in the enclosed-type turning channel 2211, a center of circle C2211*a* of the outer arced sub-segment 2211*a* and a center of circle C2211*b* of the inner arced sub-segment 2211*b* are spaced apart from each other. In the open-type turning channel 2212, a center of circle C2212*a* of the outer arced sub-segment 2212*a* and a center of circle C2212*b* of the inner arced sub-segment 2212*b* are spaced apart from each other.

Specifically, the enclosed-type turning channel 2211 of each of the two turning segments 221 is integrally connected to one of the two outer rail segments 222 through the outer arced sub-segment 2211*a* thereof and is integrally connected to one of the inner rail segments 223 through the inner arced sub-segment 2211*b* thereof, thereby jointly forming one of the two circulation semi-seats 22*a*. In other words, in any one of the two turning segments 221 of the circulation seat 22, the enclosed-type turning channel 2211 is integrally connected to one of the two outer rail segments 222 and one of the inner rail segments 223, and the open-type turning channel 2212 is detachably assembled to another one of the two outer rail segments 222 and another one of the inner rail segments 223.

In addition, the two turning segments 221 respectively protrude from the two assembling end surfaces 213 of the slider 21, the two outer rail segments 222 each having a tubular shape are inserted into the corresponding lateral portion 212 of the slider 21, and the two inner rail segments 223 are arranged between the two lateral portions 212 of the slider 21. For example, the two inner rails segments 223 are arranged between the corresponding lateral portion 212 of the slider 21 and the corresponding lateral surface 12 of the rail 1, and any one of the rollers 23 on the two inner rail segments 223 rollably contacts the corresponding lateral surface 12.

Specifically, as shown in FIG. 2 to FIG. 4 and FIG. 9, each of the two turning segments 211 has a layout surface 2213 arranged adjacent to the corresponding assembling end surface 213 and an oil multi-channel 2214 that is recessed in the layout surface 2213 and that is in spatial communication with two of the rolling channels P. Accordingly, the linear guideway 100 in the present embodiment is formed with the oil multi-channel 2214 at a specific position of each of the turning segments 221 (e.g., the layout surface 2213 adjacent to the corresponding assembling end surface 213), so that a lubricating oil can be more uniformly distributed in the rolling channels P for facilitating smooth rolling of the rollers 23.

It should be noted that a structure of the oil multi-channel 2214 can be adjusted or changed according to practical requirements, and the following description describes an exemplary structure of the oil multi-channel 2214, but the present disclosure is not limited thereto.

In the present embodiment, the oil multi-channel 2214 of each of the two turning segments 221 includes an input channel 2214*a*, at least two supply channels 2214*b* being in spatial communication with the input channel 2214*a*, and a storage channel 2214*c* that is in spatial communication with the input channel 2214*a*. The at least two supply channels 2214*b* are respectively connected to the two corresponding rolling channels P, and the storage channel 2214*c* is not in spatial communication with any one of the rolling channels P, but the present disclosure is not limited thereto. For example, in other embodiments of the present disclosure not shown in the drawings, the storage channel 2214*c* of the oil multi-channel 2214 can be omitted according to practical requirements.

Specifically, in each of the two turning segments 221 of the present embodiment, the input channel 2214*a* has a straight shape and has a first opening O1 and a second opening O2 that is opposite to the first opening O1. Each of the at least two supply channels 2214*b* and the storage channel 2214*c* extends from the second opening O2, and the storage channel 2214*c* has a straight shape.

Moreover, a quantity of the at least two supply channels 2214*b* of each of the oil multi-channels 2214 in the present embodiment is three. The three supply channels 2214*b* of one of the two turning segments 221 are respectively in spatial communication with the two inner rail segments 223 and one of the two outer rail segments 222, and the three supply channels 2214*b* of another one of the two turning segments 221 are respectively in spatial communication with the two inner rail segments 223 and another one of the two outer rail segments 222, but the present disclosure is not limited thereto. For example, in other embodiments of the present disclosure not shown in the drawings, a quantity of the supply channels 2214*b* of each of the oil multi-channels 2214 can be two or four.

The two end caps 4 are respectively fixed to the two assembling end surfaces 213 of the slider 21, and each of the two end caps 4 has an oil injection channel 41. Two of the turning segments 221 respectively belonging to the two circulation seats 22 and arranged adjacent to each other are disposed in one of the two end caps 4 and enable the two oil multi-channels 2214 thereof to be in spatial communication with the corresponding oil injection channel 41. In other words, the input channel 2214*a* is in spatial communication with the oil injection channel 41 through the first opening O1, such that the lubricating oil can be injected into the oil injection channels 41 of the two end caps 4 and further flows to the rolling channels P by traveling along the oil multi-channels 2214.

It should be noted that the rolling channels P can be defined by the sliding module 2 and the two end caps 4. Each of the rolling channels P has a closed loop-shape, and the rolling channels P correspond in position to the two lateral surfaces 12 of the rail 1. In addition, the dust-proof members 3 are arranged along the sliding direction D1 and respectively correspond in position to the two circulation seats 22, and the dust-proof members 3 respectively abut against the two lateral surfaces 12 of the rail 1, so that the rolling channels P can be isolated from an external environment for achieving a dust-proof effect.

Specifically, as shown in FIG. 2 to FIG. 4 and FIG. 10, each of the dust-proof members 3 is an elongated structure being parallel to the sliding direction D1 and has two distal portions 31 that respectively protrude from the two assembling end surfaces 213 of the slider 21. The distal portions 31 of the dust-proof members 3 protruding from any one of the two assembling end surfaces 213 are inserted into one of the two end caps 4, and each of the dust-proof members 3 is slidable along the sliding direction D1 relative to the two end caps 4 and the sliding module 2. In addition, each of the dust-proof members 3 is preferably spaced apart from at least one of the two end caps 4 along the sliding direction D1 by a gap G.

The dust-proof members 3 in the present embodiment are of the substantially the same structure and are each integrally formed as a single one-piece structure, and the dust-proof members 3 can be divided into two lower dust-proof members 3*a* and two upper dust-proof members 3*b* according to assembling positions thereof. In other words, the positions of the two lower dust-proof members 3*a* are away from the upper surface 11 of the rail 1, and the position of the upper dust-proof members 3*b* are close to the upper surface 11 of the rail 1, but the present disclosure is not limited thereto. For example, in other embodiments of the present disclosure not shown in the drawings, the structure of the lower dust-proof member 3*a* can be different from that of the upper dust-proof member 3*b*.

As shown in FIG. 2 and FIG. 10 to FIG. 13, the sliding module 2, the dust-proof members 3 (or the two lower dust-proof members 3*a*), and the two end caps 4 in the present embodiment are jointly defined as a dust-proof mechanism, and the dust-proof mechanism can be independently used (e.g., sold) or can be used in cooperation with other components according to practical requirements. Each of the two end caps 4 has two lower slots 42 and two upper slots 43. The two lower slots 42 and the two upper slots 43 are spaced apart from each other and are parallel to the sliding direction D1. Specifically, the two lower slots 42 of one of the two end caps 4 respectively correspond in position along the sliding direction D1 to the two lower slots 42 of another one of the two end caps 4, and the two upper slots 43 of one of the two end caps 4 respectively correspond in position along the sliding direction D1 to the two upper slots 43 of another one of the two end caps 4.

Each of the two lower dust-proof members 3*a* is arranged along the sliding direction D1, and the two lower dust-proof members 3*a* respectively correspond in position to the two circulation seats 22 and respectively abut against the two lateral surfaces 12 of the rail 1. The two distal portions 31 of each of the two lower dust-proof members 3*a* respectively protrude from two assembling end surfaces 213 of the slider 21. Any two of the lower slots 42 respectively belonging to the two end caps 4 and arranged along the sliding direction D1 are respectively sleeved at the two distal portions 31 of one of the two lower dust-proof members 3*a* and are cooperated with the slider 21 along the sliding direction D1 to jointly have a total length L that is within a range from 100.4% to 110% of a length L3*a* of a corresponding one of the two lower dust-proof members 3*a*, such that each of the two lower dust-proof members 3*a* is slidable along the sliding direction D1 relative to the two end caps 4 and the sliding module 2.

Accordingly, each of the two lower dust-proof members 3*a* of the linear guideway 100 in the present embodiment is provided in a rail-type installation by being cooperated with the sliding module 2 and the two end caps 4, such that each of the two lower dust-proof members 3*a* can automatically adjust its position to absorb an interference generated from the rail 1 when being in contact with the rail 1, thereby maintaining a more stable contact between the lower dust-proof members 3*a* and the rail 1.

In addition, due to the structures of the two upper dust-proof members 3*b* in the present embodiment being identical to that of the lower dust-proof members 3*a*, the two upper dust-proof members 3*b* also have the above technical effects. In other words, the two upper dust-proof members 3*b* of the present embodiment are preferably provided with the following connection relationships.

The two upper dust-proof members 3*b* respectively correspond in position to the two circulation seats 22 and that respectively abut against the two lateral surfaces 12 of the rail 1. Each of the two upper dust-proof members 3*b* is arranged along the sliding direction D1, and the two distal portions 31 of each of the two upper dust-proof members 3*b* respectively protrude from the two assembling end surfaces 213 of the slider 21. Any two of the upper slots 43 respectively belonging to the two end caps 4 and arranged along the sliding direction D1 are respectively sleeved at the two distal portions 31 of one of the two upper dust-proof members 3*b* and are cooperated with the slider 21 along the sliding direction D1 to jointly have the total length L that is within a range from 100.4% to 110% of a length L3*b* of a corresponding one of the two upper dust-proof members **3*b*, such that each of the two upper dust-proof members 3*b* is slidable along the sliding direction D1 relative to the two end caps 4 and the sliding module 2**.

It should be noted that the structure of the two lower dust-proof members **3*a* (or the two upper dust-proof members 3*b*) can be adjusted or changed according to practical requirements, and the following description describes an exemplary structure of the two lower dust-proof members 3*a* for easily understanding the present embodiment. As the two lower dust-proof members 3*a* in the present embodiment are of substantially the same structure or a mirror-symmetrical structure, the following description discloses the structure of just one of the two lower dust-proof members 3*a* for the sake of brevity, but the present disclosure is not limited thereto. For example, in other embodiments of the present disclosure not shown in the drawings, if the two lower dust-proof members 3*a* achieve the function of moving relative to the slider 21 and the two end caps 4, the two lower dust-proof members 3*a*** can be of different structures.

In the present embodiment, the lower dust-proof member **3*a* includes a main segment 31*a*, a contact segment 32*a*, and a buffer segment 33*a*. The contact segment 32*a* and the buffer segment 33*a* are respectively connected to two sides of the main segment 31*a*. Each of the main segment 31*a*, the contact segment 32*a*, and the buffer segment 33*a* is an elongated structure parallel to the sliding direction D1, and two end parts thereof respectively belong to the two distal portions 31 of the lower dust-proof member 3*a***.

Specifically, the main segment **31*a* abuts against the corresponding circulation seat 22 along a thickness direction D2 that is perpendicular to the sliding direction D1, the contact segment 32*a* extends from one side of the main segment 31*a* along a width direction D3 that is perpendicular to the sliding direction D1 and the thickness direction D2, and the buffer segment 33*a* extends from another side of the main segment 31*a***.

Moreover, the contact segment **32*a* abuts against the corresponding lateral surface 12 of the rail 1, and when the contact segment 32*a* is pressed, the lower dust-proof member 3*a* is movable along at least one of the thickness direction D2 and the width direction D3. Specifically, in any one of the two distal portions 31 of the lower dust-proof member 3*a* provided by the present embodiment, the main segment 31*a* and the corresponding lower slot 42 have a longitudinal gap G1 therebetween along the thickness direction D2, and the buffer segment 33*a* and the corresponding lower slot 14 have a transverse gap G2 therebetween along the width direction D3, such that the lower dust-proof member 3*a* can be moved or rotated toward the longitudinal gap G1 and/or the transverse gap G2** for absorbing the interference.

In addition, each of the two circulation seats 22 further includes a first buffer slot 224, and each of the lower slots 42 includes a second buffer slot 421. Any two of the lower slots 42 respectively belonging to the two end caps 4 and arranged along the sliding direction D1 are in spatial communication with one of the first buffer slots 224 through the second buffer slots 421 thereof so as to jointly form a buffer slot B.

Furthermore, the buffer segment **33*a* of each of the two lower dust-proof members 3*a* has a rib 331*a* that is arranged in one of the buffer slots B and that is not in contact with an inner wall of the corresponding buffer slot B. Accordingly, the rib 331*a* is maintained in the corresponding buffer slot B, so that the lower dust-proof member 3*a* can be stably assembled to the sliding module 2 and the two end caps 4, and the lower dust-proof member 3*a*** can easily absorb the interference by being rotated.

Beneficial Effects of the Embodiment

In conclusion, any one of the linear guideway, the sliding module, and the circulation seat in the present disclosure is formed with the oil multi-channel at a specific position of each of the turning segments (e.g., the layout surface adjacent to the corresponding assembling end surface), so that a lubricating oil can be more uniformly distributed in the rolling channels for facilitating smooth rolling of the rollers.

Moreover, in any one of the linear guideway and the dust-proof mechanism of the present disclosure, each of the two lower dust-proof members of the linear guideway is provided in a rail-type installation by being cooperated with the sliding module and the two end caps, such that each of the two lower dust-proof members can automatically adjust its position to absorb an interference generated from the rail when being in contact with the rail, thereby maintaining a more stable contact between the lower dust-proof members and the rail.

In addition, in any one of the linear guideway, the sliding module, and the circulation seat of the present disclosure, each of the turning segments of the linear guideway is configured to have a specific proportional relationship of the first radius and the second radius, each of the outer rail segments corresponds to the radius, and each of the inner rail segments corresponds to the radius, such that the rollers can more smoothly turn and roll along the rolling channels.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A linear guideway, comprising:

a rail having two lateral surfaces being opposite to each other;

a sliding module slidably disposed on the rail along a sliding direction and including:

a slider including a base portion and two lateral portions that extend from the base portion, wherein inner sides of the two lateral portions of the slider respectively face toward the two lateral surfaces of the rail;

two circulation seats respectively assembled to the two lateral portions and respectively arranged adjacent to the two lateral surfaces, wherein each of the two circulation seats has two rolling channels and includes:

two turning segments respectively protruding from two assembling end surfaces of the slider, wherein each of the two turning segments has a layout surface arranged adjacent to a corresponding one of the two assembling end surfaces and an oil multi-channel that is recessed in the layout surface and that is connected to two of the rolling channels;

two outer rail segments inserted into a corresponding one of the two lateral portions of the slider, wherein two ends of each of the two outer rail segments are respectively connected to the two turning segments; and two inner rail segments located between the corresponding lateral portion of the slider and the corresponding lateral surface of the rail, wherein two ends of each of the two inner rail segments are respectively connected to the two turning segments;

wherein, in each of the two circulation seats, each of the two outer rail segments is connected to one of the two inner rail segments through the two turning segments so as to jointly define one of the rolling channels; and a plurality of rollers assembled in the two circulation seats and movably arranged in the rolling channels of the two circulation seats;

two end caps respectively fixed to the two assembling end surfaces of the slider, wherein each of the two end caps has an oil injection channel, and wherein two of the turning segments respectively belonging to the two circulation seats are disposed in one of the two end caps and enable the two oil multi-channels thereof to be connected to the oil injection channel of the corresponding end cap; and a plurality of dust-proof members that respectively correspond in position to the two circulation seats and that respectively abut against the two lateral surfaces of the rail, wherein each of the dust-proof members is arranged along the sliding direction and has two distal portions respectively protruding from the two assembling end surfaces of the slider, and wherein the distal portions of the dust-proof members protruding from any one of the two assembling end surfaces are inserted into one of the two end caps, and each of the dust-proof members is slidable along the sliding direction relative to the two end caps and the sliding module.

2. The linear guideway according to claim 1, wherein the oil multi-channel of each of the turning segments includes:

an input channel being connected to the corresponding oil injection channel; and at least two supply channels being connected to the input channel and being respectively connected to the two of the rolling channels.

3. The linear guideway according to claim 2, wherein the oil multi-channel of each of the turning segments includes a storage channel being in connected to the input channel and being not connected to any one of the rolling channels.

4. The linear guideway according to claim 2, wherein a quantity of the at least two supply channels of each of the oil multi-channels is three, wherein, in each of the two circulation seats, the three supply channels of one of the two turning segments are respectively connected to the two inner rail segments and one of the two outer rail segments, and the three supply channels of another one of the two turning segments are respectively connected to the two inner rail segments and another one of the two outer rail segments.

5. The linear guideway according to claim 3, wherein, in each of the turning segments, the input channel has a first opening and a second opening, the first opening is connected to the corresponding oil injection channel, each of the at least two supply channels and the storage channel extends from the second opening, and each of the input channel and the storage channel has a straight shape.

6. The linear guideway according to claim 1, wherein each of the dust-proof members is spaced apart from at least one of the two end caps along the sliding direction by a gap.

7. The linear guideway according to claim 1, wherein in each of the two circulation seats, any one of the two turning segments has two outer arced sub-segments and two inner arced sub-segments that are respectively connected to the two outer arced sub-segments; each of the outer arced sub-segments has a first radius, and each of the inner arced sub-segments has a second radius that is within a range from 90% to 110% of the first radius; two ends of each of the outer rail segments are respectively connected to two of the outer arced sub-segments that respectively belong to two of the turning segments; and two ends of each of the inner rail segments are respectively connected to two of the inner arced sub-segments that respectively belong to two of the turning segments.

* * * * *